United States Patent [19]

Schenk

[11] Patent Number: 5,025,657
[45] Date of Patent: Jun. 25, 1991

[54] PROCESS AND DEVICE FOR TESTING THE TIGHTNESS OF A FLEXIBLE PLASTIC CONTAINER

[75] Inventor: Bernd Schenk, Waldbronn, Fed. Rep. of Germany

[73] Assignee: Helga Schenk, Waldbronn, Fed. Rep. of Germany

[21] Appl. No.: 487,210

[22] Filed: Mar. 1, 1990

[30] Foreign Application Priority Data

Mar. 1, 1989 [DE] Fed. Rep. of Germany ....... 3906361

[51] Int. Cl.⁵ .............................. G01M 3/36
[52] U.S. Cl. ........................ 73/37; 73/49.2
[58] Field of Search ............ 73/49.2, 37, 49.3, 52, 73/49.8, 45, 45.1, 45.2, 45.3

[56] References Cited

U.S. PATENT DOCUMENTS 3,762,213 10/1973 Nowicki ............................ 73/49.2
4,295,566 10/1981 Vincek ............................. 73/49.2

Primary Examiner—Hezron E. Williams
Assistant Examiner—Joseph W. Roskos
Attorney, Agent, or Firm—Jeffers, Hoffman & Niewyk

[57] ABSTRACT

In a process for testing the tightness of a flexible collapsible container which in condition of use is sealed by means of a screw cap screwed on a spout, the container is evacuated after its manufacture, tightly sealed and subsequently subjected to atmospheric pressure. If the container is tight, it will remain its shape caused by the vacuum. The device for the application of this process consists essentially of a suction bell on which the container is placed and features a rotor unit with the aid of which a cap can be screwed on the container. The invention enables as such a simple and dependable testing of collapsible plastic containers, but also of containers of stable form as well as closures, specifically screw caps.

8 Claims, 1 Drawing Sheet

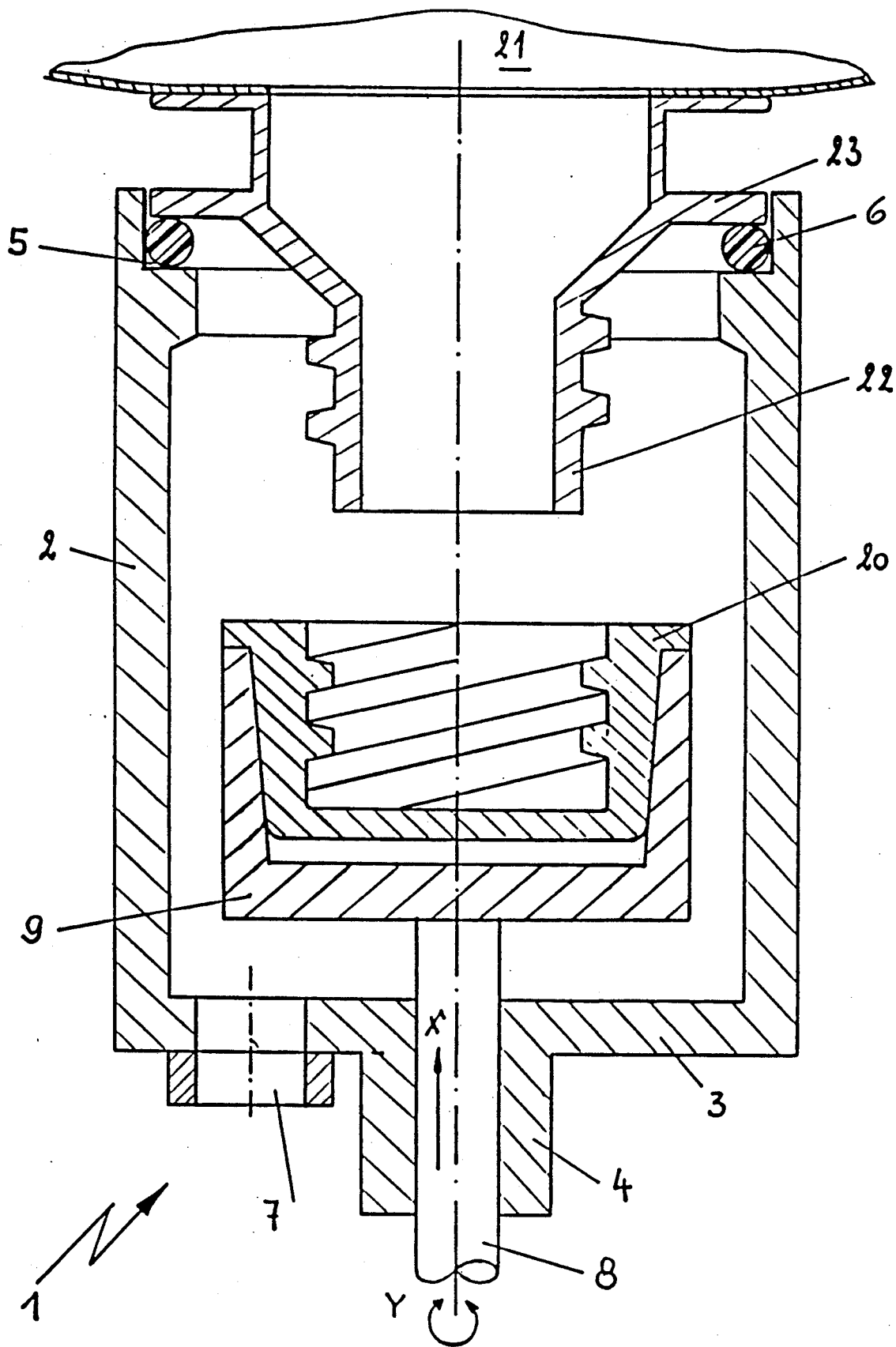

PROCESS AND DEVICE FOR TESTING THE TIGHTNESS OF A FLEXIBLE PLASTIC CONTAINER

The present invention concerns a process for testing the tightness of a flexible, collapsible plastic container which in condition of use is sealed by a screw cap which is screwed on a spout; the invention also concerns a device for the application of the process.

For ecological reasons, flexible packaging is increasingly used for beverage and chemical products. Especially semiflexible plastic containers in stable folding boxes, so-called dual-material liquid packing, having proven themselves for expensive and/or hazardous products. This packaging concept achieves with a suitable design of the individual elements a good ratio of costs to benefits and high reliability. However, the plastic materials used for applicational reasons and the wall thicknesses of the containers occasionally cause non-uniform stress distributions, wrinkles and reduced strength of the welding seam. Over the course of time, i.e., after a certain time of storage, these insufficiencies lead to microholes and microcracks in the flexible containers so that, eventually, their intended function will be affected to varying degrees. It has been demonstrated that a tightness check that follows the production immediately or a general function check alone is insufficient to assure the absolute safety which is required in view of specific hazardous goods. To completely eliminate the defects that are attributable to microholes and/or microcracks, a 100% functional check is required after a specific period of storage, for instance 4 weeks.

The tightness test method utilizing differential pressure instrumenmts, as typically applied in connection with hollow bodies, is applied by the users of the described packaging mostly directly before filling. This method is especially favorable when the containers have already been inserted in the load bearing external box of the dual-material liquid packaging, because a higher test pressure can then be applied. However, subjecting already folded containers that have been stored for a certain time to such a test causes a high handling expense. A maximum of safety can be achieved only when testing containers that have not been folded. The refolding required after the test without additional heating of the containers, however, is associated with risks because folding edges and kinks and, in turn, microholes and/or microcracks can be created again. Another disadvantage of the pressure testing method applied to containers not supported by an external box is a relatively long test time with only small defects.

The problem underlying the present invention consists in providing a process for testing the tightness of a flexible container which is not associated with the above disadvantages and is simple to perform while yielding dependable test results, which specifically allow for the said time factor.

This problem is solved by evacuating the container immediately afater its manufacture, sealing the container tightly at its spout and subjecting the tightly sealed collapsed container to atmospheric pressure.

Thus, the container to be tested is evacuated immediately after its manufacture and tightly sealed. The spout has been installed and the container is already folded (inverted) about a so-called inverting seam. The container will remain in its folded form when it is absolutely tight—should only be the slightest leak be given, the container would in the course of time relax, due to the relaxation property of the plastic material. Even smallest leaks lead after a relatively short time, for instance already after 2 hours, to a relaxation of the folded container walls, so that the difference between a tight and a leaky container will be readily visible with the naked eye.

In a preferred embodiment of the basic idea of the present invention, the container to be tested is after its evacuation tightly sealed with a screw cap which is used to seal the inside of the container, which may be a dual-material liquid container.

Thus, along with testing the tightness of the container, also the tightness of the screw connection between the screw cap and the spout is tested. Such a testing of the container closure, i.e., of the screw cap, was not possible with the prior differential pressure test method because it was always performed with an adapter, and always with one and the same adapter.

An additional advantage of the containers which are stored in evacuated condition and, as the case may be, so transported, is constituted by the fact that, due to the reduced container volume, greater packing density is achieved.

The present invention will be more fully explained hereafter with the aid of a device for the application of the process in accordance with one form of the invention. This device is shown in the drawing in the form of a basic illustration.

The basic element of the device for the application of the process for testing the tightness of a flexible container is a suction bell 1 which essentially comprises a hollow cylindrical tube 2. This tube 2 features an end portion 3 which, in turn, includes a hollow journal 4 which is coaxial with the axis of the tube. The other end of the tube 2 includes an internal, annular collar 5 on which, from the end side, a ring seal 6 can be placed. The suction bell 1 features additionally a connection socket 7 for the line of a vacuum pump (not shown). The journal 4 serves the alignment and mounting of a pilot rod 8 of a screwhead 9, which features a suitable holder for a screw cap 20 of a container 21 to be tested. The screwhead 9 is movable (arrow X) with the aid of the pilot rod 8, coaxial to the axis of the tube 2 and thus of the suction bell 1. Additionally, the screwhead 9 is rotatable (arrow Y) about the axis of the pilot rod 8.

The function of the device and the proccess to be performed with it, is as follows:

Inserted in the suction bell 1 and in the respective holder of the screwhead 9, is a standard screw cap 20 for a container 21. Container 21, in turn, is now placed, with its spout 22 in front, on the other end of the tube 2 in such a way that the sealing flange 23 of spout 22 will bear on ring seal 6. Inverted prior to its placement on the suction bell 1, container 21 now rests on the suction bell 1 and protrudes with its spout 22 into the interior of the suction bell 1. In this starting condition, the screwhead 9 with the screw cap 20 is spaced from the spout 22.

Next, the sequential control will be activated. The sequential control starts the vacuum pump, which through the line coupled to the socket 7 evacuates the interior of the suction bell 1. Upon reaching a predetermined vacuum in the suction bell 1, the pilot rod 8 is then moved axially in the direction toward the spout 22. Once the screw cap 20 bears on the spout 22, a torque-limited air driver is activated, which runs the screw cap 20 on the spout 22. Once the predetermined torque is reached, the line to the vacuum pump or the corresponding vacuum valve (not shown) is closed.

Now, the container 21, evacuated and tightly sealed with the screw cap 20, can be removed upon introduction of compressed air into the suction bell 1. Any leak in the container will readily be visible within a very short time, because of the relaxation moment of the container walls.

The process described above and the device for the application of this process have been illustrated in conjunction with testing the tightness of so-called collapsible plastic containers. However, the invention is not limited as such to this application. Thus, in a special application of the basic idea of the invention it is also possible to test containers of stable form, for instance cans, for tightness. When a container of stable form is evacuated to an extent such that its walls deform in response to the vacuum, the tightness can be checked. The container of stable form is tightly sealed after evacuation and will retain its deformed shape if it is tightly sealed.

Another special application of the process according to the invention concerns the isolation test of container closures, specifically of screw caps. In this case, the closure to be tested is installed tightly on an evacuated container, which will retain its shape conforming to the vacuum if the closure seal is tight.

What is claimed is:

1. A process for testing the tightness of a flexible, collapsible plastic container which in use is sealed with a screw cap screwed on a spout of the container and for testing the tightness of the screw cap on the container, said process comprising: evacuating air from the container immediately after manufacture of the container thereby causing the container to collapse, sealing the evacuated and collapsed container at the spout by means of a screw cap screwed thereon, and subjecting the sealed, collapsed container to atmospheric pressure.

2. The process of claim 1 wherein the container is a can.

3. A process for testing the tightness of a flexible, collapsible, plastic container which in use is sealed with a screw cap screwed on a spout of the container, said process comprising: evacuating air from the container immediately after manufacture of the container thereby causing the container to collapse, sealing the evacuated and collapsed container at the spout, and subjecting the sealed, collapsed container to atmospheric pressure, wherein the screw cap employed in use of the container is screwed on the evacuated and collapsed container.

4. The process of claim 3 wherein air is evacuated from the container by connecting the spout to a vacuum pump, and upon reaching a certain vacuum in the container, the screw cap is installed on the spout to seal the container, and the container is then subjected to atmospheric pressure by separating the spout from the pump.

5. A device for testing the tightness of a flexible, collapsible, plastic container by evacuating air from the container to cause the container to collapse and then sealing the container, said device comprising a hollow cylindrical suction bell which is connected to a vacuum pump, the suction bell including on one end thereof an axially movable and rotatable screwhead and on the other end thereof, coaxial to the screwhead, a bore with a ring seal suited for introduction of the spout.

6. A device according to claim 5, characterized in that the screwhead includes a holder for a screw cap.

7. A device for testing the tightness of a flexible, collapsible, plastic container by evacuating air from the container to cause the container to collapse and then sealing the collapsed container with a screw cap, said device comprising a hollow cylindrical suction bell which is connected to a vacuum pump, the suction bell including on one end thereof an axially movable and rotatable screwhead adapted to hold a screw cap and on the other end thereof, coaxial to the screw head, a bore with a ring seal suited for introduction of the spout.

8. A process for testing the tightness of a flexible, collapsible, plastic container which in condition of use is sealed with a screw cap which is screwed on a spout, specifically on a flexible internal container of a dual-material liquid packaging, characterized in that the container is evacuated immediately after its manufacture to collapse the container, in that the evacuated and collapsed container is then tightly sealed at the spout, and the tightly sealed collapsed container is subjected to atmospheric pressure.

* * * * *